United States Patent
Brooks

[19]

[11] Patent Number: 5,877,571
[45] Date of Patent: Mar. 2, 1999

[54] HEAD DISK ASSEMBLY HAVING A WASHER BETWEEN A DISK CLAMP AND DISK AND METHOD OF MAKING

[75] Inventor: Peter Everett Brooks, Rochester, Minn.

[73] Assignee: Western Digital Corporation, Irvine, Calif.

[21] Appl. No.: 960,661

[22] Filed: Oct. 30, 1997

[51] Int. Cl.$^6$ .................... G11B 17/022; G11B 17/038
[52] U.S. Cl. .................... 360/99.12; 360/98.08; 29/603.03
[58] Field of Search .............. 360/97.01, 98.08, 360/99.12; 29/603.03

[56] References Cited

U.S. PATENT DOCUMENTS

| | | | |
|---|---|---|---|
| 4,561,035 | 12/1985 | McDorman et al. | 360/137 |
| 5,031,062 | 7/1991 | Wood et al. | 360/98.08 |
| 5,075,808 | 12/1991 | Johnson | 360/98.08 |
| 5,333,080 | 7/1994 | Ridinger et al. | 360/99.12 |
| 5,426,548 | 6/1995 | Fujii et al. | 360/98.08 |
| 5,504,638 | 4/1996 | Kinoshita et al. | 360/98.08 |
| 5,517,376 | 5/1996 | Green | 360/98.08 |
| 5,590,004 | 12/1996 | Boutaghou | 360/99.12 |
| 5,624,584 | 4/1997 | Koriyama et al. | 219/69.12 |
| 5,663,851 | 9/1997 | Jeong et al. | 360/98.08 |
| 5,724,718 | 3/1998 | Moir et al. | 29/603.03 |
| 5,761,002 | 6/1998 | Moir et al. | 360/98.08 |
| 5,790,345 | 8/1998 | Alt | 360/98.08 |
| 5,801,901 | 9/1998 | Bryan et al. | 360/98.08 |

*Primary Examiner*—William J. Klimowicz
*Attorney, Agent, or Firm*—Leo J. Young; W. Chris Kim; Milad Shara

[57] ABSTRACT

A head disk assembly includes a base, a cover attached to the base and a spindle motor mounted to the base. The spindle motor includes a shaft, an inner cylindrical portion surrounding the shaft, and an outer cylindrical portion surrounding the inner cylindrical portion. The outer cylindrical portion has an annular surface and the inner cylindrical portion has a cylindrical surface which extends above the annular surface. The head disk assembly also includes a disk mounted on the spindle motor such that the disk surrounds the outer cylindrical portion; the disk includes a recording surface which is substantially co-planar with the annular surface. The head disk assembly also includes a disk clamp for clamping the disk to the spindle motor and a washer positioned between the disk clamp and the recording surface for transferring radial loads to the inner cylindrical portion of the spindle motor. The washer includes an inner perimeter which defines a plurality of segments, each segment bounded by a pair of openings and each segment having a contact surface such that each contact surface contacts a respective portion of the cylindrical surface of the inner cylindrical portion.

11 Claims, 5 Drawing Sheets

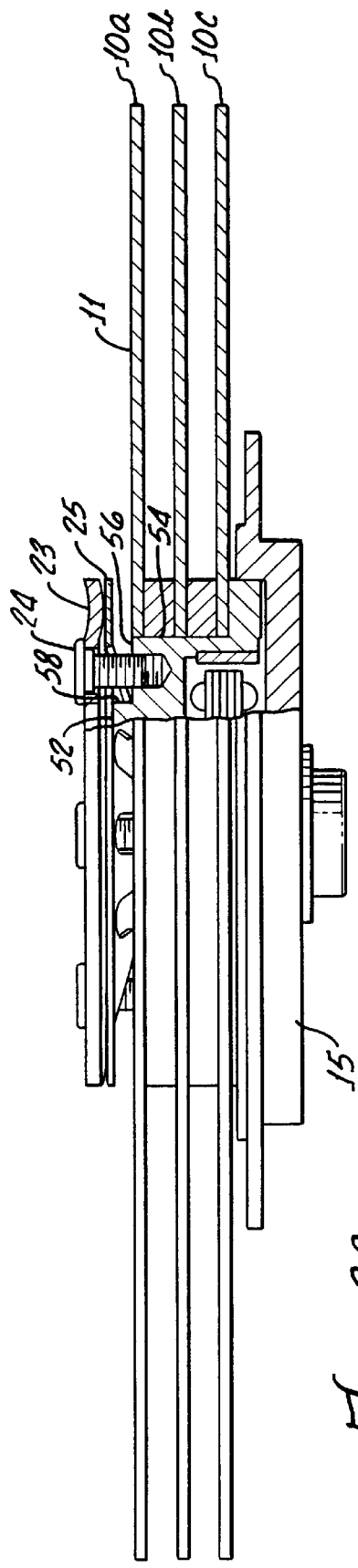
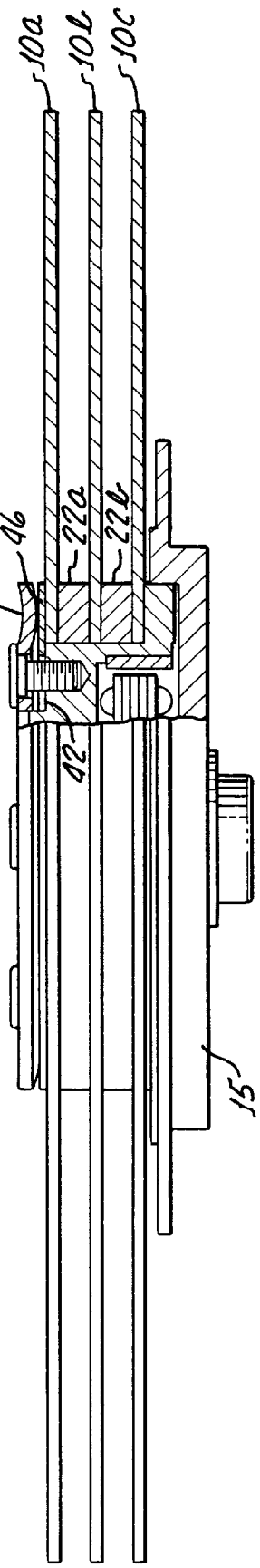

HEAD DISK ASSEMBLY HAVING A WASHER BETWEEN A DISK CLAMP AND DISK AND METHOD OF MAKING

BACKGROUND OF THE INVENTION

1. Field of the Invention

This invention relates to disk drives. More particularly, it relates to a head disk assembly for a hard disk drive having a washer between a disk clamp and disk and method of making such a head disk assembly.

2. Description of the Prior Art and Related Information

Typically, the main assemblies of a hard disk drive are a head disk assembly and a printed circuit board assembly.

The head disk assembly includes an enclosure including a base and a cover, at least one disk having at least one recording surface, a spindle motor for causing each disk to rotate, and an actuator arrangement; a disk clamp is typically used to clamp each disk to the spindle motor. The printed circuit board assembly includes circuitry for processing signals and controlling operations. Actuator arrangements can be characterized as either linear or rotary; substantially every contemporary cost-competitive small form factor drive employs a rotary actuator arrangement.

In the course of assembling a head disk assembly, one of the stages typically includes installing a disk stack to a spindle motor mounted in a base. A disk stack typically includes a plurality of disks and a spacer positioned between any two given disks. The plurality of disks includes at least a top disk and a bottom disk. After the disk stack is installed, a disk clamp is typically used for clamping the disk stack to the spindle motor using a plurality of screws; the disk clamp includes a bottom surface, a portion of which abuts a top recording surface of the top disk. When the disk clamp is initially installed, the screws are partially tightened to apply an axial load on the disk stack to allow the disk stack to rotate in unison during a subsequent balancing step. After the disk stack is balanced, the screws are finally tightened to securely clamp the disk clamp to the spindle motor.

When the screws are finally tightened, the portion of the disk clamp which abuts the top recording surface of the top disk transfers radial loads to the disk stack such that the disk stack shifts radially relative to a longitudinal axis of a shaft of the spindle motor. This shifting of the disk stack results in the disk stack becoming imbalanced if a sufficient amount of shift has occurred. When the imbalance occurs, the screws and the disk clamp must be discarded and new parts must be used to again clamp the disk stack to the spindle motor. Also, the disk stack must be balanced again which increases the assembly time of a head disk assembly.

SUMMARY OF THE INVENTION

This invention can be regarded as a head disk assembly for a disk drive which includes a base, a cover attached to the base, and a spindle motor mounted to the base. The spindle motor includes a shaft, an inner cylindrical portion surrounding the shaft, and an outer cylindrical portion surrounding the inner cylindrical portion. The outer cylindrical portion has an annular surface and the inner cylindrical portion has a cylindrical surface which extends above the annular surface. The head disk assembly also includes a disk mounted on the spindle motor such that the disk surrounds the outer cylindrical portion; the disk includes a recording surface which is substantially co-planar with the annular surface. The head disk assembly also includes a disk clamp for clamping the disk to the spindle motor, fastener means for applying a clamping force to the disk clamp, and a washer between the disk clamp and the recording surface for transferring radial loads to the inner cylindrical portion of the spindle motor. The washer includes an inner perimeter which defines a plurality of segments, each segment bounded by a pair of openings and each segment having a contact surface such that each contact surface contacts a respective portion of the cylindrical surface of the inner cylindrical portion.

This invention can also be regarded as a method making a head disk assembly for a disk drive including the steps of providing a base and mounting a spindle motor to the base. The spindle motor includes a shaft, an inner cylindrical portion surrounding the shaft, and an outer cylindrical portion surrounding the inner cylindrical portion. The outer cylindrical portion has an annular surface and the inner cylindrical portion has a cylindrical surface which extends above the annular surface. The method also includes the step of mounting a disk on the spindle motor such that the disk surrounds the outer cylindrical portion; the disk has a recording surface which is substantially co-planar with the annular surface. The method also includes the steps of providing a washer above the recording surface and providing a disk clamp above the washer. The washer includes an inner perimeter which defines a plurality of segments, each segment bounded by a pair of openings and each segment having a contact surface such that each contact surface contacts a respective portion of the cylindrical surface of the inner cylindrical portion. The disk clamp includes a plurality of holes. The method also includes the steps of providing fastener means for clamping the disk clamp to the spindle motor such that the fastener means corresponds to respective holes in the disk clamp, partially tightening the fastener means, balancing the disk, and finally tightening the fastener means such that radial loads generated by the final tightening are transferred to the inner cylindrical portion of the spindle motor by the washer; after the final tightening step, the disk substantially maintains the balance provided by the balancing step.

BRIEF DESCRIPTION OF THE DRAWINGS

FIG. 3A is a cross section view of the spindle motor arrangement shown in FIG. 1; it includes a spindle motor, disks, spacers, disk clamp, washer, and screws partially inserted into a portion of the arrangement;

FIG. 3B is a cross section view of the spindle motor arrangement shown in FIG. 1; it includes a spindle motor, disks, spacers, disk clamp, washer, and screws fully inserted into a portion of the arrangement;

DESCRIPTION OF THE PREFERRED EMBODIMENTS

Figure 1:
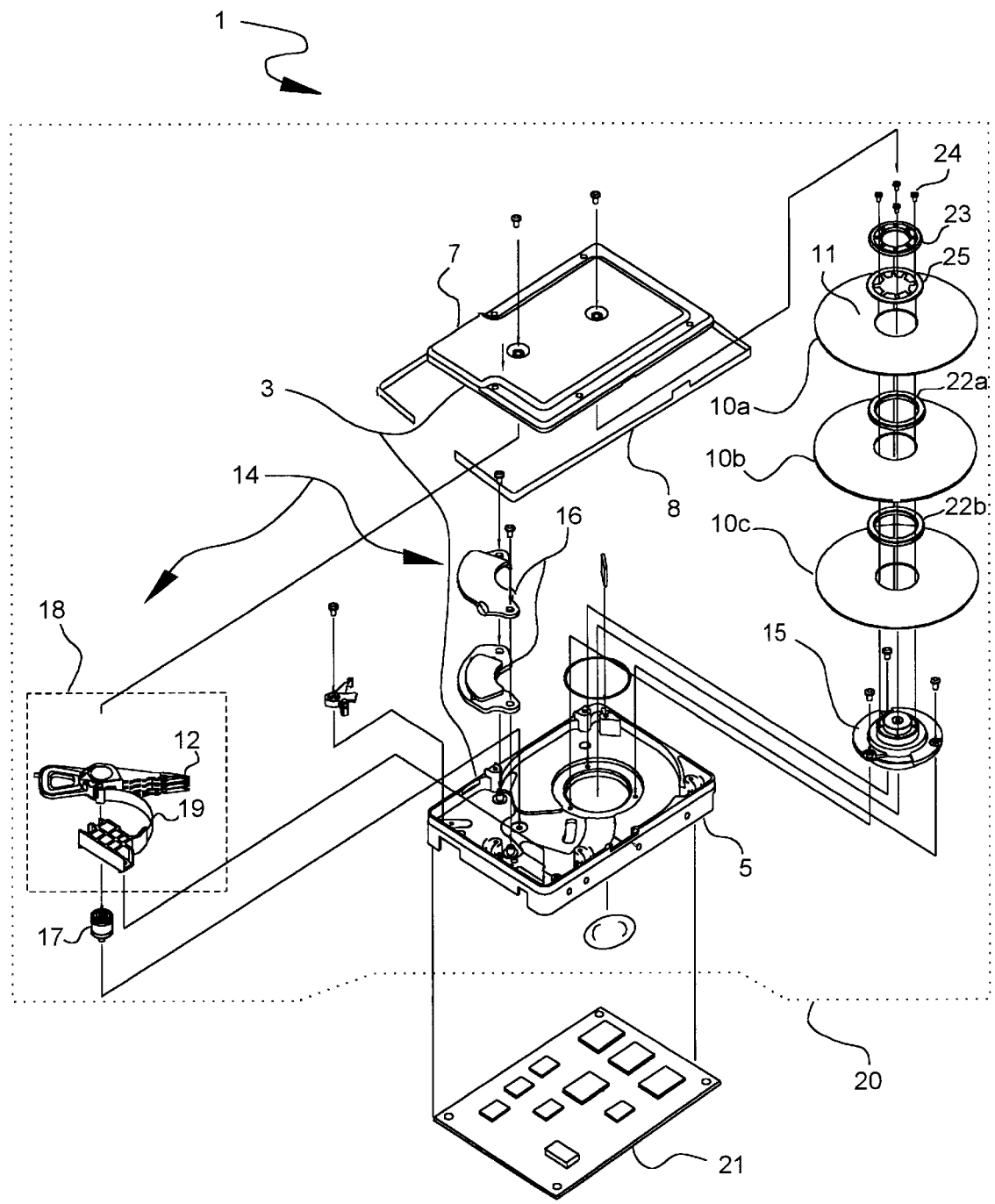
FIG. 1 is an exploded view of a hard disk drive including an embodiment of this invention.

With reference to FIG. 1, a disk drive such as a hard disk drive 1 embodying this invention includes a head disk assembly (HDA) 20 and a printed circuit board assembly 21 which contains the circuitry for processing signals and controlling operations of disk drive 1. Head disk assembly 20 includes an enclosure 3 comprising a base 5 and a cover 7 attached to base 5. Enclosure 3 is sealed to provide a relatively contaminant-free interior for head disk assembly 20 of disk drive 1. Suitably, a tape seal 8 is used to seal enclosure 3.

Figure 5:
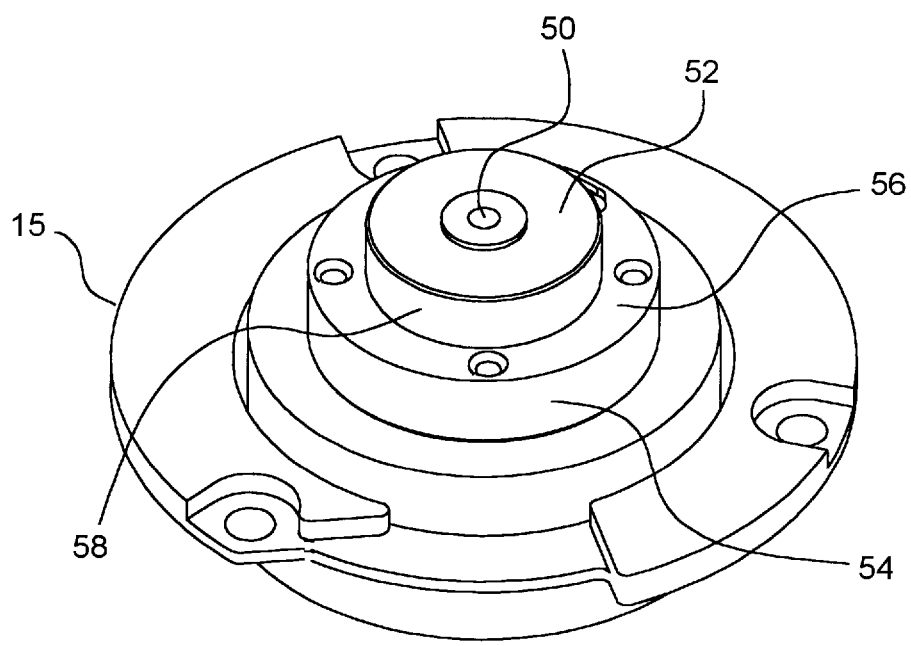
FIG. 5 is an isometric view of the spindle motor shown in FIG. 1.

Within its interior, head disk assembly 20 includes a spindle motor 15 mounted to base 5, a plurality of magnetic disks 10a–10c mounted on spindle motor 15, each disk having a recording surface 11, and a magnetic transducer 12. Spindle motor 15 causes each disk 10 to spin, preferably at a constant angular velocity. The particular embodiment shown in FIG. 1 includes three disks 10a–10c, providing six recording surfaces, and includes six magnetic transducers 12. While the preferred implementation of this invention is in conjunction with a plurality of disks, this invention may also be used within a disk drive having a single disk. Head disk assembly 20 further includes a disk clamp 23 for clamping the disks to spindle motor 15, fastener means for applying a clamping force to disk clamp 23 such as screws 24, a washer 25 positioned between disk clamp 23 and top disk 10a, and disk spacers 22a and 22b. Disk clamp 23 includes a plurality of holes, each hole corresponding to a respective U-shaped opening in washer 25. Suitably, four screws 24 are used to apply the clamping force to disk clamp 23. Alternatively, disk clamp 23 may be clamped down to spindle motor 15 using a heat fitting technique. A sufficient amount of heat would be applied to disk clamp 23 such that the disk clamp expands thereby achieving an interference fit with a portion of the spindle motor, such as an inner cylindrical portion 52 (FIG. 5). Alternatively, disk clamp 23 may be clamped down to spindle motor 15 using a suitable press fitting technique.

Head disk assembly 20 further includes a rotary actuator arrangement generally indicated at 14. Rotary actuator arrangement 14 provides for positioning magnetic transducer 12 over a selected area of recording surface 11 of disk 10. Rotary actuator arrangement 14 includes a permanent-magnet arrangement generally indicated at 16, a pivot bearing cartridge 17 and a head stack assembly 18. Pivot bearing cartridge 17 includes a stationary shaft secured to enclosure 3 to define an axis of rotation for rotary actuator arrangement 14. Head stack assembly 18 includes a flex circuit assembly 19.

Figure 2A:
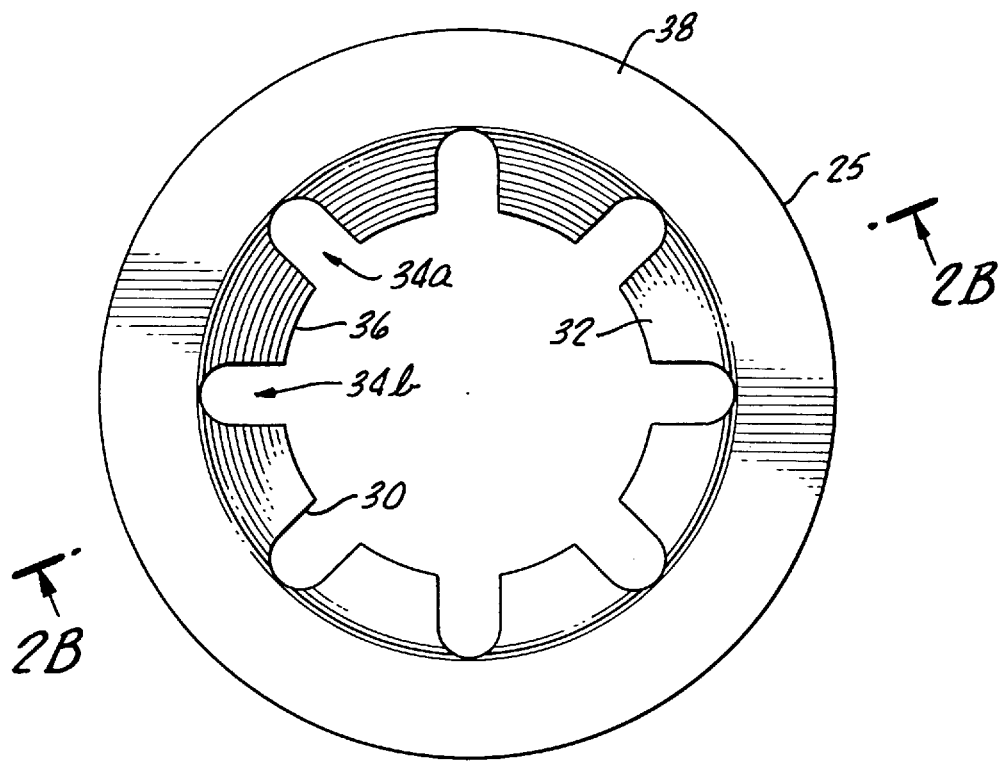
FIG. 2A is a plan view of the washer shown in FIG. 1 according to an embodiment of this invention.

With reference to FIG. 2A, washer 25 includes an annular body 38 and an inner perimeter 30 which defines a plurality of segments 32. Each segment is bounded by a pair of openings 34a and 34b and each segment includes a contact surface 36 for contacting a respective portion of spindle motor 15; preferably, each opening is U-shaped and eight segments 32 are used with the segments spaced at equal intervals. Suitably, washer 25 may be made from a material such as metal; preferably the washer is made from either aluminum or stainless steel. Suitable methods such as stamping or using a die casting may be used to make washer 25. Preferably, the material of washer 25 should be selected such that it matches the thermal expansion coefficients of adjacent components; for example, if disk clamp 23 and the outer surface of spindle motor 15 were made from aluminum, then, washer 25 would be aluminum as well.

Figure 2B:
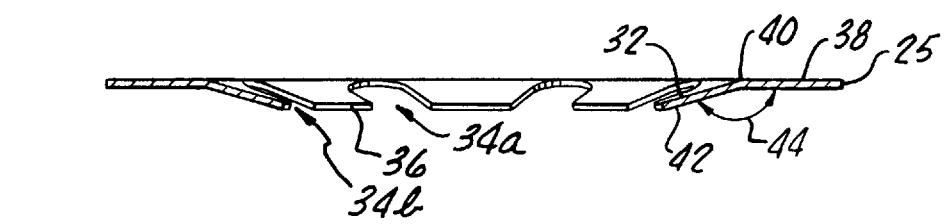
FIG. 2B is a cross section view of FIG. 2A.

With reference to FIG. 2B, a cross section of washer 25 includes a bend 40. A cross section 42 of segment 32 is shown at an angle 44 from a cross section of annular body 38. As shown, each segment 32 is bent down relative to annular body 38 for providing clearance to inner cylindrical portion 52 (FIG. 3a) for assembly of washer 25 into disk drive 1 (FIG. 1). Suitably, angle 44 is greater than ninety degrees as measured from annular body 38. Contact surface 36 is rectangular in shape with its respective segment bounded by openings 34a and 34b.

With reference to FIGS. 3A and 3B, disks 10a–10c are mounted on spindle motor 15 with spacers 22a and 22b positioned between the disks. Spindle motor 15 includes inner cylindrical portion 52 having a cylindrical surface 58 and an outer cylindrical portion 54 surrounding inner cylindrical portion 52 and having an annular surface 56. Each disk is mounted on spindle motor 15 such that each disk surrounds outer cylindrical portion 54 of the spindle motor. Disk 10a ("top disk") includes a recording surface 11 which is co-planar with annular surface 56. However, recording surface 11 of disk 10a may extend below or above annular surface 56. In FIG. 3A, washer 25 and disk clamp 23 are shown with screws 24 partially inserted into the screw holes of spindle motor 15 while FIG. 3B shows washer 25 and disk clamp 23 with screws 24 fully inserted. As shown in FIG. 3B, the annular body of washer 25 defines a cross section 46 which is co-planar with a cross section 42 of a respective segment. Alternatively, cross section 42 may be at an angle relative to cross section 46 of the annular body. Contact surface 36 (FIGS. 2A, 2B) contacts or abuts a respective portion of cylindrical surface 58 such that an interference fit is achieved between washer 25 and inner cylindrical portion 52. During a final tightening of each screw (to be described more fully with reference to FIG. 4), such that the screws are fully inserted as shown in FIG. 3B, washer 25 transfers radial loads to inner cylindrical portion 52 of spindle motor 15.

With reference to FIG. 5, portions of spindle motor 15 are more clearly shown. Spindle motor 15 also includes a shaft 50 such that inner cylindrical portion 52 surrounds shaft 50 and cylindrical surface 58 extends above annular surface 56.

Figure 4:
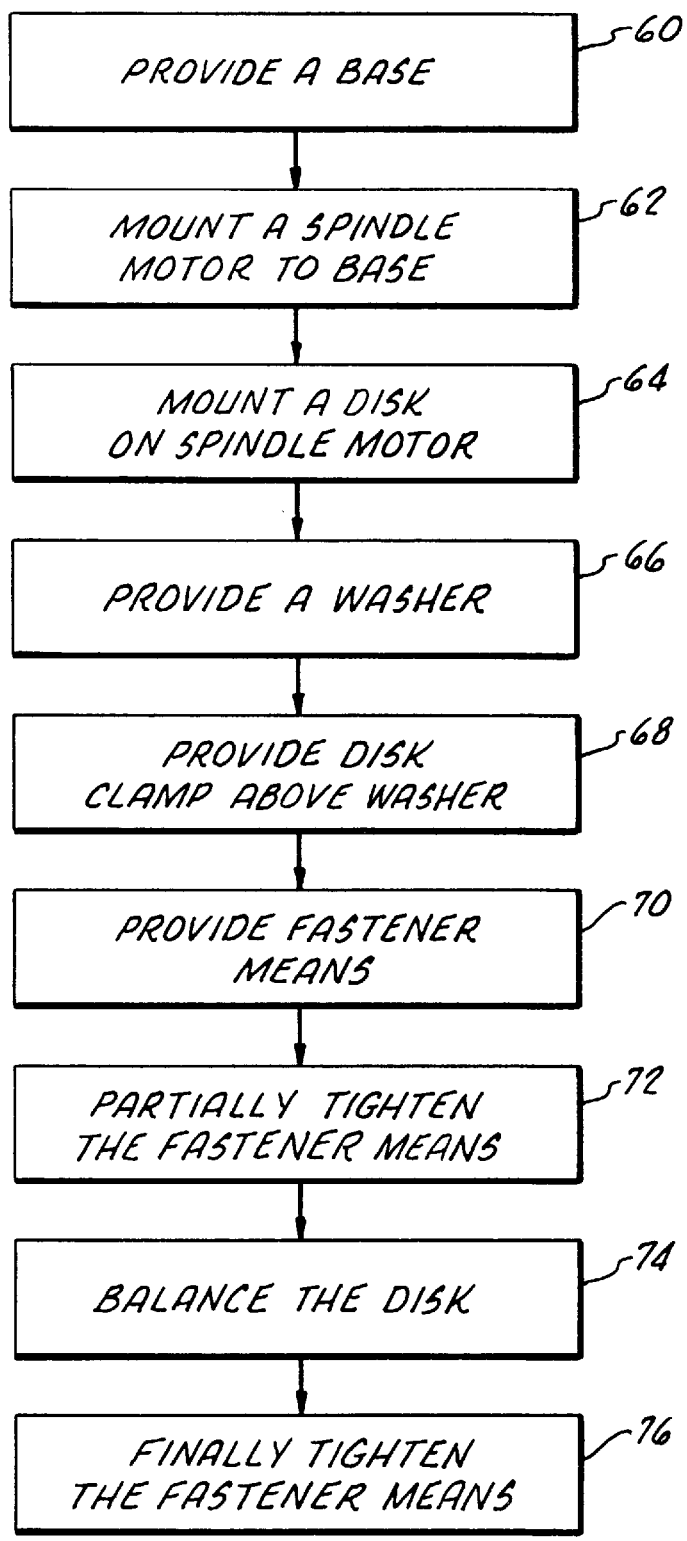
FIG. 4 is a flowchart which depicts a method of making a head disk assembly according to an embodiment of this invention.

With reference to FIG. 4 and the structure shown in FIG. 1, a method of making a head disk assembly for a disk drive includes the steps of providing a base such as base 5 at 60, mounting a spindle motor such as spindle motor 15 to the base at 62, mounting a disk such as disk 10a on the spindle motor at 64, and providing a washer such as washer 25 at 66; preferably, a plurality of disks such as disks 10a–10c are mounted. The method further includes the steps of providing a disk clamp such as disk clamp 23 above the washer at 68, and providing fastener means such as screws 24 for clamping the disk clamp to the spindle motor at 70; screws 24 correspond to respective holes in the disk clamp. The method further includes the step of partially tightening the fastener means at 72 such that after the partially tightening step, each contact surface of washer 25 (FIG. 2B) makes an interference fit with cylindrical surface 58 (FIG. 5). The method further includes the steps of balancing the disk at 74, and finally tightening the fastener means at 76 such that radial loads generated by the final tightening are transferred to the inner cylindrical portion, such as inner cylindrical portion 52, of the spindle motor by the washer.

Significantly, this invention maintains the balance, within tolerances, achieved prior to a final tightening of the screws by transferring radial loads to the inner cylindrical portion of the spindle motor during the final tightening step. As a result, this invention precludes or substantially minimizes the need to use new parts, such as new disk clamps and screws, to again clamp the new disk clamp to the spindle motor. Furthermore, the assembly time of a head disk assembly is decreased since the steps of tightening the new screws and balancing again the same disk stack are minimized.

I claim:

1. A head disk assembly for a disk drive comprising:

a base;

a cover attached to the base;

a spindle motor mounted to the base, the spindle motor having a shaft, an inner cylindrical portion surrounding the shaft, an outer cylindrical portion surrounding the inner cylindrical portion and having an annular surface, the inner cylindrical portion having a cylindrical surface which extends above the annular surface;

a disk mounted on the spindle motor such that the disk surrounds the outer cylindrical portion, the disk having a recording surface which is substantially co-planar with the annular surface;

a disk clamp for clamping the disk to the spindle motor;

fastener means for applying a clamping force to the disk clamp; and a washer between the disk clamp and the recording surface for transferring radial loads to the inner cylindrical portion of the spindle motor, the washer having an inner perimeter which defines a plurality of segments, each segment bounded by a pair of openings and each segment having a contact surface such that each contact surface contacts a respective portion of the cylindrical surface of the inner cylindrical portion whereby during assembly of the head disk assembly, after the disk is balanced, the washer substantially maintains the disk balance after the application of a tightening force to the fastener means.

2. The head disk assembly of claim 1 wherein the washer is made from stainless steel.

3. The head disk assembly of claim 1 wherein the washer is made from aluminum.

4. The head disk assembly of claim 1 wherein the washer further includes a substantially annular body, the annular body defining a cross section such that the cross section is substantially co-planar with a respective one of the plurality of segments.

5. The head disk assembly of claim 4 wherein each opening is a U-shaped opening.

6. The head disk assembly of claim 5 wherein the plurality of segments are spaced at equal intervals.

7. The head disk assembly of claim 6 wherein the plurality of segments includes at least three segments.

8. The head disk assembly of claim 1 wherein the disk clamp includes a plurality of holes, each hole corresponding to each opening in the washer.

9. The head disk assembly of claim 1 wherein the washer is made from stainless steel.

10. A method of making a head disk assembly for a disk drive comprising the steps of:

providing a base;

mounting a spindle motor to the base, the spindle motor having a shaft, an inner cylindrical portion surrounding the shaft, an outer cylindrical portion surrounding the inner cylindrical portion and having an annular surface, the inner cylindrical portion having a cylindrical surface which extends above the annular surface;

mounting a disk on the spindle motor such that the disk surrounds the outer cylindrical portion, the disk having a recording surface which is substantially co-planar with the annular surface;

providing a washer above the recording surface, the washer having an inner perimeter which defines a plurality of segments, each segment bounded by a pair of openings and each segment having a contact surface for contacting a respective portion of the cylindrical surface of the inner cylindrical portion;

providing a disk clamp above the washer, the disk clamp having a plurality of holes;

providing fastener means for clamping the disk clamp to the spindle motor, the fastener means corresponding to respective holes in the disk clamp;

partially tightening the fastener means;

balancing the disk; and finally tightening the fastener means such that radial loads generated by the final tightening are transferred to the inner cylindrical portion of the spindle motor by the washer, wherein after the final tightening step, the disk substantially maintains the balance provided by the balancing step.

11. The method of claim 10 wherein the washer further includes a substantially annular body, the plurality of segments of the washer are bent down relative to the annular body for providing clearance to the inner cylindrical portion of the spindle motor for assembly such that after the partially tightening step, each contact surface makes an interference fit with the cylindrical surface of the inner cylindrical portion.

* * * * *